No. 706,090. Patented Aug. 5, 1902.
J. F. NEVILLE.
LOAD BINDER.
(Application filed Mar. 31, 1902.)

(No Model.)

Witnesses:
Jas. E. Hutchinson
E. Kiser

Inventor
Joseph F. Neville,
By Swift and Co.,
Attorneys.

UNITED STATES PATENT OFFICE.

JOSEPH F. NEVILLE, OF WOODRUFF, UTAH.

LOAD-BINDER.

SPECIFICATION forming part of Letters Patent No. 706,090, dated August 5, 1902.

Application filed March 31, 1902. Serial No. 100,877. (No model.)

*To all whom it may concern:*

Be it known that I, JOSEPH F. NEVILLE, a citizen of the United States, residing at Woodruff, in the county of Rich and State of Utah, have invented a new and useful Load-Binder; and I do hereby declare the following to be a full, clear, and exact description of the invention, such as will enable others skilled in the art to which it appertains to make and use the same.

The invention relates to improvements in load-binders, and it has for its object to provide a simple, inexpensive, and efficient device capable of engaging the ends of a chain or the links thereof at any point throughout the length of the same and adapted to draw a chain tightly around a load of logs or any other material, whereby the said load is securely bound upon a wagon or other vehicle.

A further object of this invention is to provide a device of this character adapted to be readily operated to strain a chain up to the desired tension and capable of readily releasing the same when it is desired to remove the load.

The invention consists in the novel construction and arrangement of parts hereinafter described and shown, and particularly pointed out in the claims appended hereto.

Figure 1:
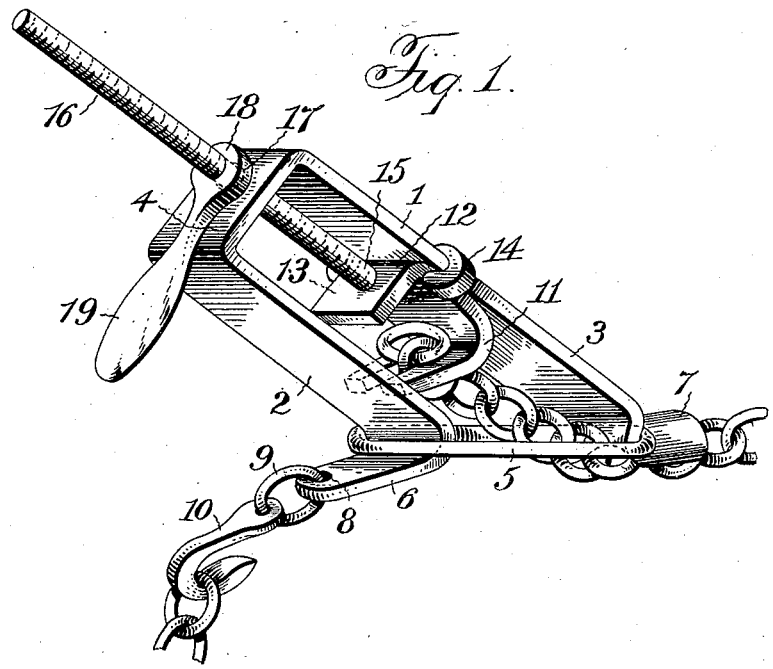
Figure 2:
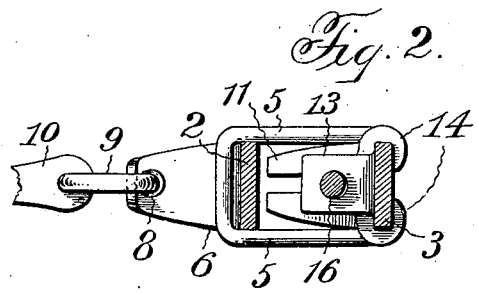

In the drawings forming part of this specification, and in which like numerals of reference designate corresponding parts, Figure 1 is a perspective view of a load-binder constructed in accordance with this invention. Fig. 2 is a transverse sectional view of the same.

1 designates an approximately oblong frame constructed of steel or other suitable material and composed of sides 2 and 3 and a connecting cross-piece 4, arranged at one end of the frame, the other end of the frame being supported by a connecting-link 5, which receives the terminals 6 and 7 of the sides 2 and 3 and which prevents the said sides from spreading when the device is subjected to a strain. The sides 2 and 3 have their terminals bent in opposite directions to receive the link, which is arranged within the bends and which is disposed at an angle, one of the sides being extended beyond the other, as clearly shown in Fig. 1. The end 6 of the side 2 is provided with a perforation 8 for a link 9, which connects a hook 10 with a frame, and the said hook is adapted to engage a link at one end of a chain, whereby the latter is connected with the device. The other end of the chain extends through the opening of the link 5 and engages a bifurcated hook or grapple 11 of a slide 12, which is mounted on the longer side of the frame and which is capable of sliding longitudinally thereof to draw the chain into the frame, whereby the chain is strained to the desired tension. The end 7 of the side 3 is curved in curved section and presents a smooth concave inner face to the chain to enable the latter to slide over it freely. One of the links of the chain is arranged in the slot or bifurcation of the hook or claw which constitutes the grapple and the outer link is arranged transversely of the hook or claw, whereby the chain is prevented from sliding through the slot or bifurcation, and by this construction the said hook or claw is adapted to engage any link of a chain.

The slide 12, which is constructed of suitable metal, is provided at its inner end with a lug 13, and it has a pair of arms 14, approximately U-shaped, as clearly shown in Fig. 2, to engage the side edges of the long side 3 of the frame; but the slide may be connected with the frame in any other suitable manner. The lug 13 is provided with a perforation in which is swiveled the inner end 15 of a screw 16, which is guided in an opening 17 of the connecting portion 4 of the frame. The screw is engaged by a nut 18, arranged on the exterior of the end portion of the frame and provided with a suitable handle 19, by means of which it is rotated. The nut 18 is adapted to be rotated to draw the screw outward to tighten the chain, and the latter may be readily strained up to the desired tension. The nut may be also readily rotated in the opposite direction to slacken the chain to permit the latter to be readily removed from a load.

The load-binder is especially adapted for binding a chain around a load of logs, where great strength is required; but it is adapted also for use on various other kinds of loads, and it will be clear that it is exceedingly simple and inexpensive in construction and that it is readily operated to bind or release a load.

It is to be understood that I do not limit myself to the precise details of construction herein shown and described and that various changes in the form, proportion, and minor details of construction within the scope of the appended claims may be made without departing from the spirit of the invention.

Having thus fully described my invention, what I claim as new, and desire to secure by Letters Patent, is—

1. A device of the class described comprising a frame composed of two sides and a connecting portion, one of the sides being shorter than the other and provided with means for engaging one end of a flexible connection, means slidable on the other side of the frame for engaging the other end of the flexible connection, and an adjusting device operating between the sides of the frame and connected with the said slidable means, substantially as described.

2. A device of the class described, comprising an approximately oblong frame, provided at one side with means for engaging a flexible connection, a slide guided on the other side of the frame and provided with means for engaging the other side of the said connection, and an adjusting device for operating the slide, substantially as described.

3. A device of the class described, comprising an approximately oblong frame provided at one side with means for engaging a flexible connection, a slide arranged within the frame and provided with arms embracing the other side of the same and having a lug at one end and provided at the other end with means for engaging the flexible connection, a screw, connected with the lug and means for adjusting the screw, substantially as described.

4. A device of the class described, comprising an approximately oblong frame, having one side longer than the other, the terminals of the sides, being extended in opposite directions, a link connecting the ends of the sides, means connected with the shorter side of the frame for engaging one end of a flexible connection, a slide mounted on the long side of the frame for engaging the other end of the flexible connection, and an adjusting device connected with the slide, substantially as described.

5. A device of the class described, comprising an approximately oblong frame, having one side longer than the other, the terminals of the sides being extended in opposite directions and the end of the long side being provided with a concave inner face, a hook connected with the short side for engaging one end of a chain, a slide mounted on the long side of the frame and having a bifurcated claw for engaging the other end of the chain, a link connecting the end to the sides and an adjusting device for operating the slide, substantially as described.

In testimony whereof I have hereto affixed my signature in the presence of two witnesses.

JOSEPH F. NEVILLE.

Witnesses:
ALBERT FRAZIER,
JAMES WALTON.